ис009860324B1

United States Patent
Roskind (10) Patent No.: US 9,860,324 B1
(45) Date of Patent: Jan. 2, 2018

(54) RAPID ESTABLISHMENT OF A CONNECTION FROM MULTIPLE ADDRESS LOCATIONS

(71) Applicant: Google Inc., Mountain View, CA (US)

(72) Inventor: James Anthony Roskind, Redwood City, CA (US)

(73) Assignee: Google LLC, Mountain View, CA (US)

( * ) Notice: Subject to any disclaimer, the term of this patent is extended or adjusted under 35 U.S.C. 154(b) by 476 days.

(21) Appl. No.: 14/566,671

(22) Filed: Dec. 10, 2014

(51) Int. Cl.
*H04L 29/08* (2006.01)

(52) U.S. Cl.
CPC .......... *H04L 67/146* (2013.01); *H04L 67/141* (2013.01)

(58) Field of Classification Search
CPC ............... H04L 29/06; H04L 29/08576; H04L 29/08072; H04L 29/0809; H04L 29/06095; H04L 29/06537
See application file for complete search history.

(56) References Cited

U.S. PATENT DOCUMENTS

| 9,432,182 | B2 * | 8/2016 | Barrus ................. | G06F 21/6254 |
| 2010/0208706 | A1 * | 8/2010 | Hirano ................ | H04W 60/005 370/332 |
| 2011/0167255 | A1 * | 7/2011 | Matzkel .............. | H04L 63/0428 713/153 |
| 2013/0047218 | A1 * | 2/2013 | Smith ..................... | H04L 63/06 726/4 |
| 2013/0047245 | A1 * | 2/2013 | Radhakrishnan ....... | G06F 21/34 726/9 |
| 2013/0097233 | A1 * | 4/2013 | Raman .................... | G06Q 50/01 709/204 |
| 2013/0145148 | A1 * | 6/2013 | Shablygin ........... | H04L 63/0853 713/155 |
| 2013/0225080 | A1 * | 8/2013 | Doss ....................... | H04L 63/10 455/41.2 |
| 2015/0295916 | A1 * | 10/2015 | Sanso ................. | H04L 63/0807 726/9 |

OTHER PUBLICATIONS

A. Snoeren, et al., "An End-to-End Approach to Host Mobility," 6$^{th}$ ACM/IEEE International Conference on Mobile Computing and Networking (MobiCom '00), 2000, 12 pages.
A. Langley, et al., "QUIC Crypto," Jun. 20, 2013, 17 pages.
(Continued)

*Primary Examiner* — Abdullahi E Salad
(74) *Attorney, Agent, or Firm* — McDermott Will & Emery LLP (57) ABSTRACT

A first computing device receives a first token with a first request for data from a second computing device located at a first network address, the first token being associated with a second network addresses previously associated with the second computing device during previous communications with the first computing device. The first computing device determines that the first token is not associated with the first network address, and generates a second token for the computing device. The second token is associated with the first network address and the second network address. The first computing device then provides the second token to the computing device for use in establishing future network communications from the first network address and from the second network address.

20 Claims, 5 Drawing Sheets

(56) References Cited

OTHER PUBLICATIONS

N. Willis, "Connecting on the QUIC," LWN.net, Jul. 17, 2013, pp. 1-13, Eklektix, Inc., <http://lwn.net/Articles/558826/>.
J. Roskind, "Multiplexed Stream Transport Over UDP," QUIC, edited Dec. 2, 2013, 51 pages.
R. Shade, "QUIC—Next Generation Muliplexed Transport Over UDP," streamed live Feb. 11, 2014, 29 pages.
"QUIC Wire Layout Specification," retrieved Dec. 10, 2014, 17 pages, <https://docs.google.com/document/d/1WJvyZftAO2pq77yOLbp9NsGjC1CHetAXV810fQu-B_U/edit>.

* cited by examiner

RAPID ESTABLISHMENT OF A CONNECTION FROM MULTIPLE ADDRESS LOCATIONS

BACKGROUND

When a communication between two devices on the Internet is established, a series of round trip messages may be exchanged to confirm that the computers are indeed who they say they are before substantive data communicated between the devices. Internet protocols often use elaborate handshaking processes to ensure reliability of communications.

SUMMARY

The subject technology provides a system and computer-implemented method for rapid establishment of a connection from multiple address locations. In various aspects, the method may include receiving a first token with a first request for data from a computing device located at a first network address, the first token being associated with a second network address previously associated with the computing device, determining that the first token is not associated with the first network address, generating a second token for the computing device, the second token being associated with the first network address and the second network address, and providing the second token to the computing device for use in establishing future network communications from the first network address and from the second network address. Other aspects include corresponding systems, apparatuses, and computer program products for implementations of the computer-implemented method.

In various aspects, a computer program product tangibly embodied in a computer-readable storage device comprises instructions that, when executed by a first computing device, cause the first computing device to facilitate receiving a first token with a first request for data from a second computing device located at a current network address, the first token being embedded with respective network address representations of one or more network addresses previously associated with the second computing device during one or more network communications with a first computing device, the respective network address representations being in a format not readable by the computing device, decode at least a portion of the first token using an algorithm stored at the first computing device to reveal the respective network address representation and to determine that the first token is a valid token, determine that the current network address of the second computing device is not represented by any of the revealed respective network address representations, generate a second token for the second computing device, the second token being embedded with the current network address and the one or more network addresses previously associated with the second computing device, and provide the second token to the second computing device for use in establishing future network communications with the first computing device. Other aspects include corresponding systems, apparatuses, and computer program products for implementation of the machine-readable medium.

In further aspects, a system may include one or more processors and a memory. The memory includes instructions that, when executed by the one or more processors, cause the one or more processors to facilitate the steps of receiving a first token with a first request for data from a computing device located at a first network address, the first token being associated with a second network address previously associated with the computing device, the first token and the first request for data being received without establishing a network connection with the computing device through one or more round-trip network communications, determining that the first token is a valid token, determining that the first token is not associated with the first network address, generating a second token for the computing device, the second token being associated with the first network address and the second network address, and providing the second token to the computing device for use in establishing future network communications from the first network address and from the second network address.

It is understood that other configurations of the subject technology will become readily apparent to those skilled in the art from the following detailed description, wherein various configurations of the subject technology are shown and described by way of illustration. As will be realized, the subject technology is capable or other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In some instances, structures and components are shown in block diagram form in order to avoid obscuring the concepts of the subject technology.

An authenticated token is a token that when used during communications provide some verifiable aspect of the identity of the user or device using the token. For example, an authenticated token may be a token that once issued can later be computationally confirmed by the issuing device or an affiliate of the issuing device to have been produced by the issuing device or affiliate device. Additionally or in the alternative, the token may be authenticated in that an identifier or key provided by the token may be held by the issuing device (e.g., in a list of authenticated tokens). In some aspects, the token may include a keyed-hash of the remainder of the data in the token so that only the device holding the corresponding key may unlock the data.

To reduce the number of round trips that may be required to establish a network connection, the subject technology utilizes an authenticated token called a "source address token." According to aspects of the subject technology, a first computing device may issue a "source address token" to a second computing device for use by the second computing device in reestablishing future communication with the first computing device. The source address token includes an encrypted representation of the current network address of the second computing device. The source address token may then be used by the second computing device, in subsequent connection attempts, to evidence that the network address of the second computing device is the actual address of the second computing device. In this manner the computing devices may establish a connection, including using a previously set up encryption scheme, without the need for multiple round trips to set up the connection.

The source address token may include multiple (optionally encrypted or obscured) network address representations (e.g., encoded source network addresses or other source identifiers) to facilitate validation of the computing device using the token in network communications. In this regard, the network address representation(s) may be encoded in a format unreadable by the first computing device. For example, a representation may be encrypted and/or encoded, for example, using a hash function.

When communicating for the first time, the two computing devices may perform a handshaking procedure to confirm that they are who they say they are (e.g., they are indeed at the network addresses identified within their packet communications) and to set up certain parameters for the communication (e.g., encryption). On receiving the post-handshake data request, the first computing device may generate a source address token for the second computing device. In various implementations, the first computing device may embed (e.g., store or encode) a representation of the network address currently associated with the second computing device, or an address used to communicate with the second computing device, within the source address token, and provide the token to the second computing device for use in reestablishing future communications with the first computing device.

In one or more implementations, a network address representation (or the network address) may be a portion of the network address. For example, if the network address of the second computing device is seen as 1.2.3.4, the first computing device may generate a source address token for the second computing device that includes the portion 1.2.3.*, with an asterisk. operating as a wild card. In this manner, all addresses starting with 1.2.3 may be used by the second computing device as verifiable addresses. The wild card portion of the address representation may be at any part of the address.

After receiving the source address token from the first computing device, the second computing device may use the token in subsequent connection requests to evidence its location on the network to facilitate the establishment of a connection between the devices using parameters of a prior connection. In an example implementation, when receiving data requests from the second computing device, the first computing device reads the token to confirm that the second computing device is at the same address represented in the token. When the network address is confirmed (e.g., using a source address token), the first computing device assumes that the second computing device is at the address it was during a previous connection and/or is using the same connection parameters, and may begin transmitting a response without further handshaking. In some implementations, the transmission may begin immediately after the verification. In other implementations, other validations or data exchanges may take place prior to the transmission of data.

In various aspects of the subject technology, the second computing device may change its network address but nevertheless attempt to establish a connection using a token associated with the previously used network address. If the second computing device attempts to connect to the first computing device from the new address, the first computing device will not be able to verify the network address or the second computing device using the token. However, the first computing device may instead recognize the token as otherwise valid. In response to receiving an otherwise valid token, the first computing device may generate a new source address token having multiple embedded network addresses, including the current and previous network addresses associated with the second computing device and then send the new token back to the second computing device for use in establishing a connection from any of the addresses within the token. The token may, for example, include multiple network addresses accumulated over time.

In some implementations, the first computing device may require the second computing device to resend a newly issued token back to the first computing device before the first computing device provides any substitute data (e.g., data other than handshaking communications). When a data request and the new source address token are received from the second computing device, the first computing device reads the token and confirms that the current network address is represented in the token. Once the address is confirmed by the first computing device, the first computing device may respond to the data request.

The second computing device uses the new token reestablish future communications with the first computing device from any of the network addresses embedded within the token. Each time the first computing device receives the new token, it may accept the token and begin transmitting data, optionally allowing a more immediate transfer of data. As will be described further, network addresses may be removed from a token by the first computing device based on a predetermined expiration period, maximum number of allowed address, etc.

Figure 1:
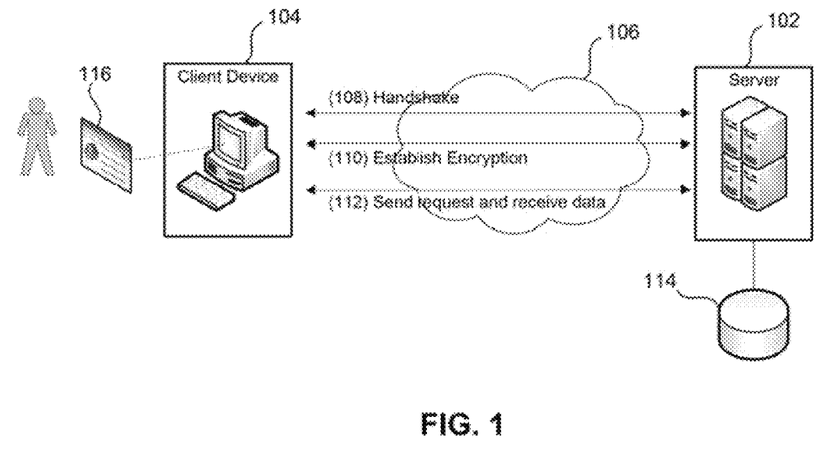
FIG. 1 depicts a diagram of an example interaction between two computing devices during the establishment of an example data connection.

FIG. 1 depicts a diagram of an example interaction between two computing devices during the establishment of an example data connection, according to one or more aspects of the subject technology. A first computing device 102 and a second computing device 104 are connected to a network 106, and configured to send and receive connection requests and associated data across the network 106. Each of the computing devices referred to throughout this disclosure may be, for example, a smart phone, personal computer, server, router, tablet or notebook computer, personal data assistant, augmented-reality glasses, or a television or other display device with one or more computing devices embedded therein or attached thereto.

For the purpose of illustration and examples provided in this disclosure, the first computing device 102 may also be portrayed as a "server device," and the second computing device 104 may also be portrayed as a "client device." It is understood, however, that both computing devices may be a server device or a client device, and that both computing devices may interact with each other as they were in a client-server relationship or a peer-to-peer relationship without limitation.

Network 106 may be a WAN, LAN, or any other network consisting of one or multiple networking technologies (and as satellite, cellular, cable, DSL, optical network, Ethernet over twisted pairs, and others), and which deploys one or multiple networking protocols for transferring data. Network 106 may also include, but is not limited to, any one or more of the following network topologies, including a bus network, a star network, a ring network, a mesh network, a star-bus network, a tree or hierarchical network, and the like. Network 106 may also be a wireless personal area network (e.g., Bluetooth, Bluetooth Low Energy, infrared, IrDA, Wireless USB, and the like).

Network 106 includes one or more network paths server device 102 and client device 104. A network communication path between the devices may traverse one or more network nodes. A network node may include one or more devices for facilitating network communications, including server computers, routers, firewall, proxy server, and the like. In the depicted example, a packet sent by server device 102 may traverse multiple network nodes to reach client device 104. Accordingly, a network delay may be established at or between any of the nodes. Network 106 may include multiple network topologies and/or technologies. In one or more implementations, network 106 is the Internet.

TCP connections generally require the establishment of an initial handshake, in which the client device sends a hello message requesting to talk and the server device sends a return message indicating that the server will talk with the client before the client request can send a data request. This first round trip exchange of messages (108) may provide some validation to the server that the client is the address it says it is before the server will send any substantive data. After the handshake is completed, the client device may then request encryption. The establishment of encryption may include two or more additional round trips (110) to establish some shared encryption context so that the client and server may encrypt and decrypt data, respectively. After the connection is established, an additional round trip (112) is required to request and receive data.

Latency, in the context of web browsing, may be considered as the time from typing in a web address to the time in which the requested web page is displayed. With data travelling at the speed of light, each round trip may take about 100 ms. Accordingly, without any latency, establishing a normal encrypted TCP connection with encryption may take more than 300 ms before data can be requested (112). Processing delays as the packets travel through many different network nodes (e.g., routers) may further increase the latency a user experiences when initiating a connection to a particular remote device.

A latency of 100 ms or less may be perceived as instantaneous to most users. A latency of between 100 ms and 300 ms may be perceived to a user as a reasonable amount of time, while latency between 300 ms and 1 s may be considered sluggish or tedious to the user. If the latency is over 1 s some users may become disengaged and decide to switch to a different site or try a different connection. Therefore, it is desirable to reduce the latency observed in communications between a client device and a server device whenever possible. The subject technology incorporates the use of a source address token into data communications to provide a mechanism for eliminating or at least reducing the number of round trips required to establish a reliable connection, thereby reducing latency and providing a better overall user experience.

With further reference to FIG. 1, it is understood that the various round trip communications between the client device 104 and the server device 102 (e.g., 108, 110, 112) for handshaking, establishing encryption, and sending the data request are described herein as occurring in serial, or linearly. However, these communications need not be performed serially or in the order shown, and/or one more of the processes may not be performed. Additionally or in the alternative, one or more of these communications may be bundled into a single transmission such that two or more of the depicted communications may be perceived to be performed in parallel.

The server device 102 may be operably connected to a storage device 114 for the storage of various content and/or authentication information. Storage device 114 may be operably connected to server device 102 to store session context information and/or authentication-related information related to devices that communicate with server device 102. Storage device 114 may store authenticated tokens, including source address tokens, for computing devices that have previously connected to server device to receive data. Storage device 114 may also be configured to store information related to one or more user accounts. The user account may include web-based user accounts (e.g., email accounts or social network accounts and/or user-profiles) or enterprise accounts (for example, LDAP accounts).

While storage device is depicted as one unit, it is understood that storage device 104 may include multiple databases or storage devices operating in connection with each other or the social network to carry out or support the various implementations and operations described herein. Furthermore, the functionality of server device 102 and storage device 114 may be implemented on the same physical machine or distributed among a plurality of machines. Moreover, the storage device 114 may take any form such as a relational database, object-oriented database, file structure, text-based records, or other forms of data repository. While not depicted, client device 104 may also implement or be operable connected to a storage device to provide the same or similar functions a storage device 114.

In one or more implementations, server device 102 may be a web server that may host webpages, web sites, web applications, and/or other server-client applications. In this regard, server device 102 may be operably connected to one or more storage devices 114 for storage purposes related to one or more websites hosted by server device 102. A user may use, for example, client device 104 to connect to server device 102 to view web content. In one aspect, the user may interact with a user interface 116 (for example, a web browser) provided by server device 102, and having controls (for example, drop down lists, selection choices, text inputs or the like) for navigating to and for displaying one or more websites, search results, and the like. The server device 102 is operable to receive and respond to user-generated navigation requests from user interface 116, to serve one or more websites to be displayed at user interface 116.

In one or more implementations, storage device 114 may store data related to a social network, including user information for users of the social network. The user information may include user profile information for each user, social graph information, and user social activity for each user within the social network. In this regard, the webpages, web sites, web applications, and/or other server-client applications hosted by server device 102 may be directed to or associated with operation of or interaction with the social network.

Although certain examples provided herein may describe user information being stored in memory, the user may delete the information from memory and/or opt out of having the information stored in memory. In example aspects, the user can, via user interface 116, adjust appropriate privacy settings to selectively limit types of user information stored in memory, or select the memory in which the information is stored (e.g., locally on the user's device as opposed to remotely on a server). In example aspects, specific identification about the user (e.g., the user's name or network address) is not shared unless otherwise specifically provided or directed by the user.

Figure 2:
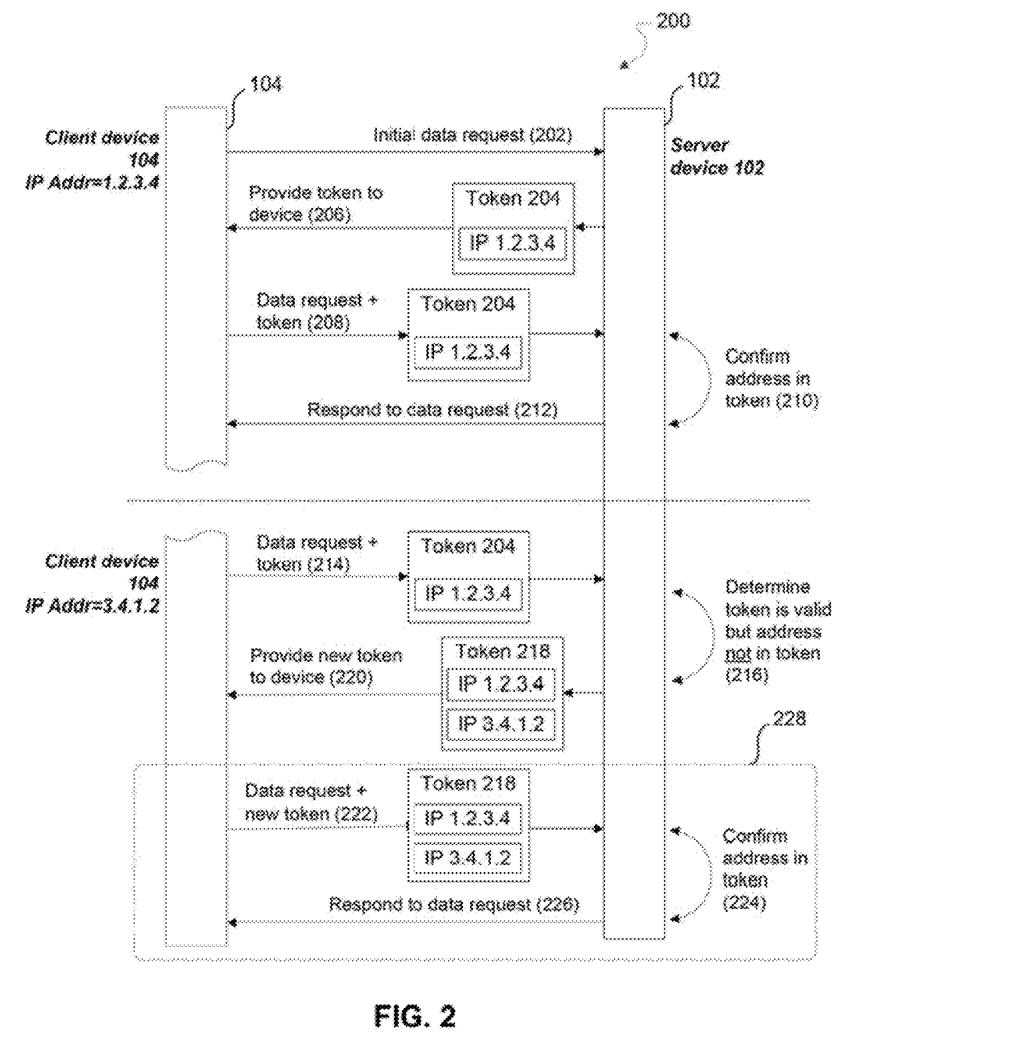
FIG. 2 depicts an example data flow through a system for rapidly establishing connections with a computing device at changing network locations.

FIG. 2 depicts an example data flow 200 through a system for rapidly reestablishing connections with a computing device at changing network locations, according to various aspects of the subject technology. The server device 102 is depicted on the right side of the data flow 200 and the client device 104 on the left side. The upper portion of FIG. 2 (I) depicts an example data flow for generating and providing a new source address token for use by client device 104 to rapidly connect with server device 102. The lower portion of FIG. 2 (II) depicts an example data flow for updating a source address token for use by client device 104 at multiple locations to rapidly connect with the server device 102 or other device responsible for issuing the token.

For explanatory purposes, steps of the data flow 200 are described herein with reference to the components of FIG. 1; however, the steps of data flow 200 may also be applicable to the various blocks of FIGS. 4 and 5, or components of FIG. 6. Further for explanatory purposes, the steps of the data flow 200 are described herein as occurring in serial, or linearly. However, the steps need not be performed in the order shown and/or one or more of the steps of the data flow 200 need not be performed.

With reference to FIG. 2 (I), server device 102 receives an initial data request (202) from a client device 104 while the client device is at a first network address (e.g., 1.2.3.4). The initial data request may be made over a connectionless communication protocol such as User Datagram Protocol (UDP) or may be made over a connection-based communication protocol such as Transmission Control Protocol (TCP). In practice, any protocol may benefit by the subject technology. According to various aspects, the subject technology provides proof of ownership of a network address during the establishment of a network connection, thereby diminishing or precluding reflection attacks, or denial of service attacks using a fraudulent source address. At the same time, the subject technology reduces latency by reducing or eliminating the need for round trip network handshaking to confirm a device is at the location it says it is, and to rapidly set up a connection using preexisting parameters.

On receiving the initial data request, and/or on being satisfied that the client device 104 is who it says it is, the server device 102 generates a source address token 204 for the client device 104. The source address token is associated with a current network address of the client device 104, and may be used by the client the device 104 in the future to evidence that the client device 104 is actually communicating from the network address or has ownership or control of the address, port, or prefix of the address.

In some implementations, on receiving the initial data request (202) from the client device 104, the server device 102 may require some form of handshaking activity before generating a source address token 204 for the client device 104. For the purpose of this disclosure, network handshaking establishes a network connection with the computing device and/or connection parameters (e.g., encryption) through one or more round-trip network communications. In some implementations, the server device 102 may generate and provide the token to the client device 104 without handshaking. The server device 102 may, for example, rely on a new request from the source address of the client device, together with retransmission of the source address token by the client device 104, evidence that the client device is who it purports to be before confirming that the communication should proceed.

On receiving an initial data request without a source address token from the client device 104, the server device 102 may extract the current network address of the client device 104 from packet headers received from the client device and generate a source address token associated with the current network address of the client device. The network address associated with the token may be an actual internet protocol address, internet packet exchange address, host address, media access control address, domain name, uniform resource locator, or the like. The network address may include a port number used by the client device 104. The network address may be associated with the token by being embedded in the token. In this manner, a network address representation of the network address may be embedded in the token. The representation may be an electronic copy of the address or an electronic copy of only a part of the address (e.g., a prefix of the address, partial address). As will be described further, the representation may be embedded in the token within group of representations (e.g., in a list), with each representation of the group corresponding to an address previously associated with the client device 104.

The network address representation(s) embedded within the source address token may be in a format readable only by the server device 102, or otherwise not readable by the client device 104. For example, the entire token, or a portion of the token corresponding to representations embedded in the token may be encrypted using a private certificate or key and/or encoded using a hash value known only to the server device 102. In this regard, a secret cryptographic key (e.g., a keyed-hash message authentication code), along with a portion of a message of the token (e.g., the address representations), may be used as input for a cryptographic hash function to encrypt the token and to generate a message authentication code (MAC). The MAC may then be later used by the server device 102 to verify both the token's integrity as well as its authenticity when the token is later presented to the server device 102. In some implementations, AEAD (Authenticated Encryption with Associated Data) may be used to provide encrypted (and/or authenticated) source address tokens.

Once generated, the source address token is provided to the client device 104 (206). The source address token may be provided as part of the data payload of one or more transmission packets used in current communication protocol. In this regard, the token itself may be encrypted (e.g., providing a double layer of encryption), together with other data of the data payload, using an encryption algorithm chosen for the transmission. As will be described further, the server device 102 may send the source address token during or after cryptographic negotiations to facilitate connectivity with the client device 104.

In some implementations, the transmission of the token to the client device 104 may be the next transmission to the client device 104 from the server device 102. However, the server device 102 may perform other activities or access other systems prior to transmitting the token to the client device. For example, server device 102 may first register the token by storing a token identifier for the token in a local storage (e.g., storage device 114). Additionally or in the alternative, the server device 102 may first access domain permission information to determine whether the client device is transmitting from an authorized domain. In some aspects, the server device may first access a header of the data request to retrieve context information from the packet header(s) (e.g., one or more cookies) to determine whether certain permissions should apply or parameters should be set, or whether certain contexts should be implemented, or whether the data request is associated with an active session or a user account registered with the server, and the like before generating and/or providing the source address token.

The client device 104 may later use the source address token to evidence that it is actually located at (or controls) the network address represented in its packet headers when attempting to communicate with the server device 102. In some implementations, when the source address token is sent to the server device 102 with a data request, the server device 102 may immediately trust that the client device 104 is a known device and start transmitting data without a handshaking procedure, thereby establishing a zero (or near zero) round trip connection handshake between the client device 104 and the server device 102.

In one or more implementations, the server device 102 may store connection parameters for each source address token issued in storage device 114. In one or more implementations, the connection parameters may be embedded in the source address token. The connection parameters may include, for example, encryption parameters for encrypting communications between the server device 102 and the client device 104. For example, the server device 102 may store encryption parameters for previous connections for which a source address token was used. In this manner, when the server device 102 receives a source address token, the server device may presume that the encryption parameters used in the previous connection are still in effect and respond to the data request provided with the token using the said encryption used in the previous connection.

As depicted by FIG. 2 (I), the client device 104 sends the source address token to the server device 102 in a subsequent transmission (208). The server device 102 receives the token from the client device 104 (e.g., in the data payload of one or more packets), and may decode the token using the hash value (or secret cryptographic key) known only to the server device 102 to reveal the contents of the token, including any network address representations. The server device 102 then may confirm whether the current network address of the client device 104 (e.g., as represented in its packet header) is associated with the source address token (210). Once confirmed, the server device 102 may begin communicating with the client device 104 (212). In some implementations, the communications may begin immediately after the verification. In some implementations, other validations or data exchanges may take place prior to the transmission data.

Accordingly, using the token of the subject technology, a client device 104 may send a authenticated source address token with a data request for a webpage to a webserver, and the web server may without further delay of a handshake procedure, send the webpage back to the client device, providing for a reduction in latency and a better user experience. The total transit time for initial request for data (sent with the token) and responding to the request may be a single round trip, thereby reducing latency and providing a better overall user experience.

In some implementations, the server device 102 may provide a new source address token 204 to client device 104 together with a response to the data request. In this manner, sending the source address token (206) and response to the data request (212) may be combined. The token may be provide, for example, in a portion of the data payload (of the network packet(s)) providing the response to the data request (212).

In some implementations, the token or a network address of the token may be associated with token information, including an expiration time (e.g., a date and/or time). For example, an embedded network address representation may include or be associated with corresponding expiration time. When the server 102 receives a token from the client device 104, the server device 102 may check the current expiration time to determine whether the token or an associated network address has expired or is about to expire (e.g., within a predetermined time prior to an expiration time). If the token or an associated network address has expired or is about to expire, a new token may be generated for client device 104, and the new token may include the updated token information. Additionally or in the alternative, the server device 102 may update the token information associated with the source address token and/or the associated network address(es) with a later expiration time.

Additionally, the server device 102 may send a new token to the client device 104 daring an active session. For example, a new token may be generated and sent to client device 104 periodically during the session and/or at the end of a session, or at a predetermined time before an expiration time. The new token may be sent after a predetermined duration relative to the expiration time, for example, to renew the token before it expires. For example, a token may have an expiration period of 24 hours, and the server device 102 may update the expiration time and/or generate and send a new token every 12 hours (or within 12 hours of its expiration).

As depicted by FIG. 2 (II), the client device 104 may then change its network address to a second network address (e.g., 3.4.1.2), for example, by moving to a different network location. For example, the user of client device 104 may have been using the device at a first network system (e.g., a home address) but has since moved the client device to a different second network system (e.g., a work address). The client device 104 may then attempt to establish communications with the server device 102 from the second network system, for example, by sending a new data request together with the previously used source address token associated with a network address of the first network system (214).

The server device 102 may receive the previously used source address token 204 from the client device 104 together with a request for data while the client device is located at the second network address (associated with the second network system). The server device 102 may proceed to decode the token 204 using an algorithm stored at the server device 102 (e.g., the hash function, together with the hash value or secret cryptographic key) to reveal the network address representation associated with the token. Wherein the source address token 204 includes an embedded network address representation, the server device 102 may determine that the network address representation does not match the current network address of the client device, but that the token is otherwise a valid token (e.g., by virtue of the server device being able to decode the token)(216).

In response to determining the source address token 204 is valid but that the current, second network address of the client device 104 is not associated with the token (e.g., by way of a corresponding network address representation not being embedded in the token), the server device 102 may generate a new, second token 218 for the client device 104. While, in some implementations, the server device 102 may replace a previously used network address with the network address currently used by the client device 104, according the various aspects of the subject technology, the server device 102 may add the currently used, second network address to a group of addresses associated with the new, second token. For example, the second token may be embedded with network address representations for the previously used network address and the currently used network addresses.

In one or more implementations, the network addresses associated with the source address token may be associated by way of being stored at the server device 102 (e.g., in storage device 114), indexed by a token identifier of the token. In this example, when the token is received by the server device 102, the token is decoded to reveal a token identifier, and the network addresses associated with the token retrieved are indexed based on the token identifier. Additionally or in the alternative, the representations may be embedded in the token within group of representations (e.g., in a list), with each representation of the group corresponding to an address previously or currently associated with the client device 104.

In some implementations, when a server generates a source address token with a group of network address representations, the network address representations may be ordered within the token (e.g., in a list). The ordering may be used to determine whether to delete, remove, or replace one or more of the group of network address representations, for example, to maintain a predetermined size of the group when a new network address representation is added to the group. A network address representation associated with, for example, the end of the ordered sequence may be designated to be expired (e.g., deleted, removed, or replaced).

The network address representations may be ordered, for example, from most recently added (or used in a connection) to the least recently used (e.g., at the end of the sequence), or based on the number of times that each associated network address has been used in communication with the server device 102 (or an affiliate of server device 102). In some implementations, each network address (or network address representation) associated with the token may be ordered by a use count. That is, each network address may be associated with a count of how many times the token was used to communicate with server device 102 (or an affiliate) from a network address associated with the network address representation. It is understood that communicating from a network address associated with a network address representation includes communicating from a network address matching a portion of the network address representation.

In some implementations, ordering of the network address representations within the token may be based on a period of use. The period of user may be, for example, a period of time in which the associated network address was used to form connections with the server device 102, or period of time since the network address representation was first embedded within the token. For example, the representations that have been in use the longest may be pushed toward to the end of the ordered sequence while newer representations are placed at or near the beginning of the sequence. Network address representations may also be ordered based on a number of units of digital information (e.g., packets, bits, or bytes) sent across one or more connections formed using the network address corresponding to the network address representation.

Token information may also include a point in time (POT). For example, when the server device 102 generates a source address token with a plurality of network address representations, the token may also associate a POT with each address. For example, the POT may include the last date and/or time, for each network address, that the server device 102 sent data in a connection to the client device 104. Server device 102 may determine whether to keep network address representation for a previously used network address of the client device based on the POT associated with the network address. For example, the server device 102 may delete, remove, or replace the oldest or lease recently used network address representation.

In some implementations, where only a portion of the address is represented by a network address representations (e.g., 1.2.3.*) the POT will correspond to the last time the server device 102 sent data to the client device when the client device was at a network address sufficiently matching the portion of the address (e.g., at 1.2.3.4 or 1.2.3.8). In some implementations, each POT may be a point after which the network address representation associated with the POT should not renewed.

Token information corresponding to a network address representation including, for example, the previously described number of units of digital information, use count, and period of use, or point of time, may be associated with the source address token by way of being embedded in the token. By way of example, token information may be embedded in the token with each network address representation (e.g., as a data parameter paired with the representation in the message). Additionally or in the alternative, the information may also be stored at the server device 102 (or storage device 114) and keyed to the token by a token identifier. When the token is decoded, the token identifier may be revealed and used by the server device 102 to index the token information stored for the token, the information used to determine the status of the corresponding network address representation (and its associated network address). The stored or embedded token information may be updated on each connection, for example, by updating the information at the server (or storage device) or reissuing the token information to the client device 104 by updating the token information within the token, or providing the updated token information in a new token. The token information may also be periodically updated at predetermined time intervals.

In some implementations, server device 102 may limit the number of network address representations and/or corresponding network addresses associated with a token. For example, token information associated with the token may include a count of network addresses N. When a new token is generated, for example to add a new network address representation, if the total number of address representations associated with the token would be greater than N then a network address representation may be removed to restrict the count of addresses associated with the token to no more than N. A network address representation may be removed based on the ordered sequence of network address representations associated with the token.

In some implementations, the server device 102 may limit the size of the token, or a portion thereof, to a predetermined number of units of digital information (e.g., bits or bytes, or number of packets required to transport the token). For example, when a new token is generated, for example to add a new network address representation to a group of network address representations embedded within the token, if the predetermined number of units of digital information would be exceeded then a network address representation may be removed to restrict the size of the token (e.g., a binary large object) to no more than the predetermined number of units of digital information.

With further reference to FIG. 2 (II), once the server device 102 generates the new, second token 218, the server device 102 provides the token 218 to the client device 104 for use in further network communications (220). The client device 104 may then send a new data request with the second token 218 to the server device 102 in a subsequent transmission (222). The server device 102 receives the second token 218 from the client device 104, and may decrypt the token (and or decode the token using the stored hash value or secret cryptographic key) to reveal the group of network address associated with the token. As described previously, the group may be represented as a group of network address representations embedded within the token. Additionally or in the alternative, the group may be revealed by first revealing the token identifier and then using the identifier to look up the group of network addresses stored in storage device 114.

The server device 102 then confirms whether the current network address of the client device 104 (e.g., as represented in its packet header) is associated with the source address token (224). The server device 102 may perform the confirmation by iterating through a group of network address associated with the second token 218 to determine whether the current network address of the client device 104 is in the group. Once confirmed, the server device 102 may establish a connection with the client device 104 and begin communicating with the client device 104 (226), for example, by providing data responsive to the new data request to the client 104. Each time the token is received with a data request (228), the transit total time for initial request for data (sent with the token) and responding to the request may be a single round trip, thereby reducing latency and providing a better overall user experience. The connection may also be established using preexisting parameters. For example, the established connection may use the same encryption scheme used in the last connection in which the token was used.

In some implementations, the server device 102 may provide the new, second source address token 218 to client device 104 together with a response to the data request. In this manner, sending the second source address token (220) and the response to the data request (226) may be combined. The token may be provided, for example, in a portion of the data payload (of the network packet(s)) providing the response to the data request (226).

Figure 3:
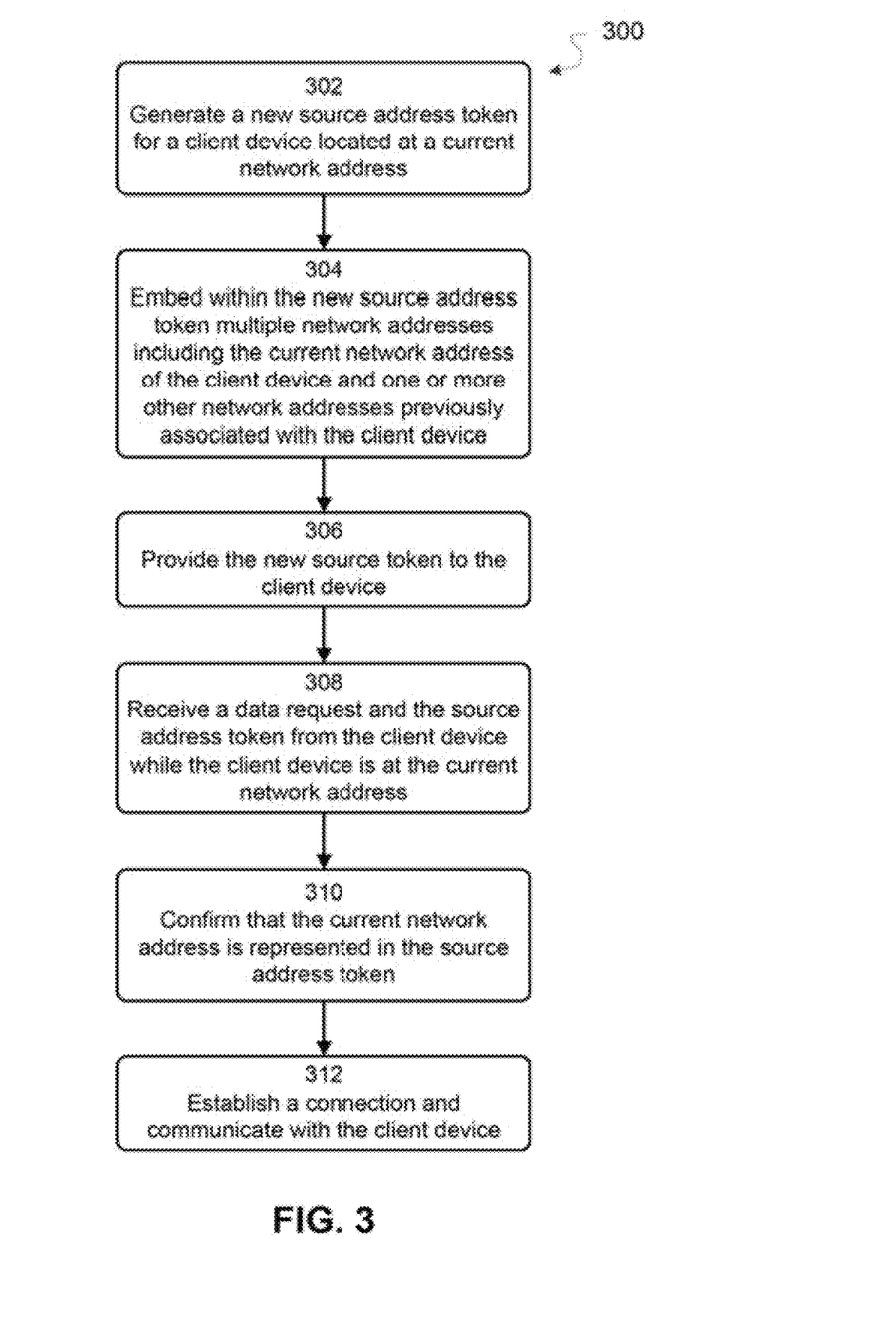
FIG. 3 illustrates a flow diagram of an example process for generating a source address token for use in rapidly establishing connections with a computing device at changing network locations.

FIG. 3 illustrates a flow diagram of an example process 300 for generating a source address token for use in rapidly establishing connections with a computing device at changing network locations, according to various aspects of the subject technology. For explanatory purposes, example process 300 is described herein with reference to the components of FIG. 1; however, example process 300 may also be applicable to portions of FIGS. 2, 4, and 5, or other component data flows and process described herein. Further for explanatory purposes, the multiple blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

In the depicted example process 300, a new source address token is generated by a server device 102 for a client device 104 located at a current network address (302). The new source address token may be generated in response to a request for data received from the client device 104. The server device 102 embeds within the new source address token multiple network addresses including the current network address of the client device 104 and one or more other network addresses previously associated with the client device (304). The network address previously associated with the computer may have previously been embedded in another, older source address token received from the client device 104, but is now unusable. For example, the server device 102, on analyzing the source address token, may have determined that the source address token is not associated with a the current network address of the client device 104.

The new source address token is provided to the client device 104 (306). In one or more implementations, the multiple network addresses associated with the new source address token are embedded within the new source address token in a format not readable (or changeable) by the client device 104. According to various aspects of the subject technology, restricting the ability of a device receiving a source address token from reading and thus being able to change its contents prevents the information within the token to be misappropriated by a surreptitious third-party. For example, the third-party is prevented from intercepting the token, changing a network address representation embedded within the token, and then using the token to attack the server device 102.

At a later time, a data request and the source address token is received from the client device 104 while the client device 104 is at the current network address (308). By way of example, the server device 102 may have generated and provided the source address token to the client device 104 but did not provide data requested by the client device to the client device with the generated token. Instead, the server device 102 returned the source address token with the instruction to re-request the data, returning the source address token back to the server device 102 with the data request.

In response to receiving the data request and source address token, the server device 102 confirms that the current network address is represented in the source address token (310). Confirming the current address is represented in the source address token may be performed by decoding the token and reading the network address representations embedded within the token, or by any other manner previously described herein.

In response to confirming that the current network address is represented in the source token, the client device 104 establishes a connection and communicates with the client device 104 (312). The connection may be established using preexisting connection parameters. Communicating with the client device 104 may include, for example, returning the requested data to the client device. Overall the data request that includes the token and the return of the data may comprise a single round trip, providing a substantial improvement in latency experienced by a user when compared to the multiple round trips required to receive data described by steps 108, 110, and 112 of FIG. 1.

Figure 4:
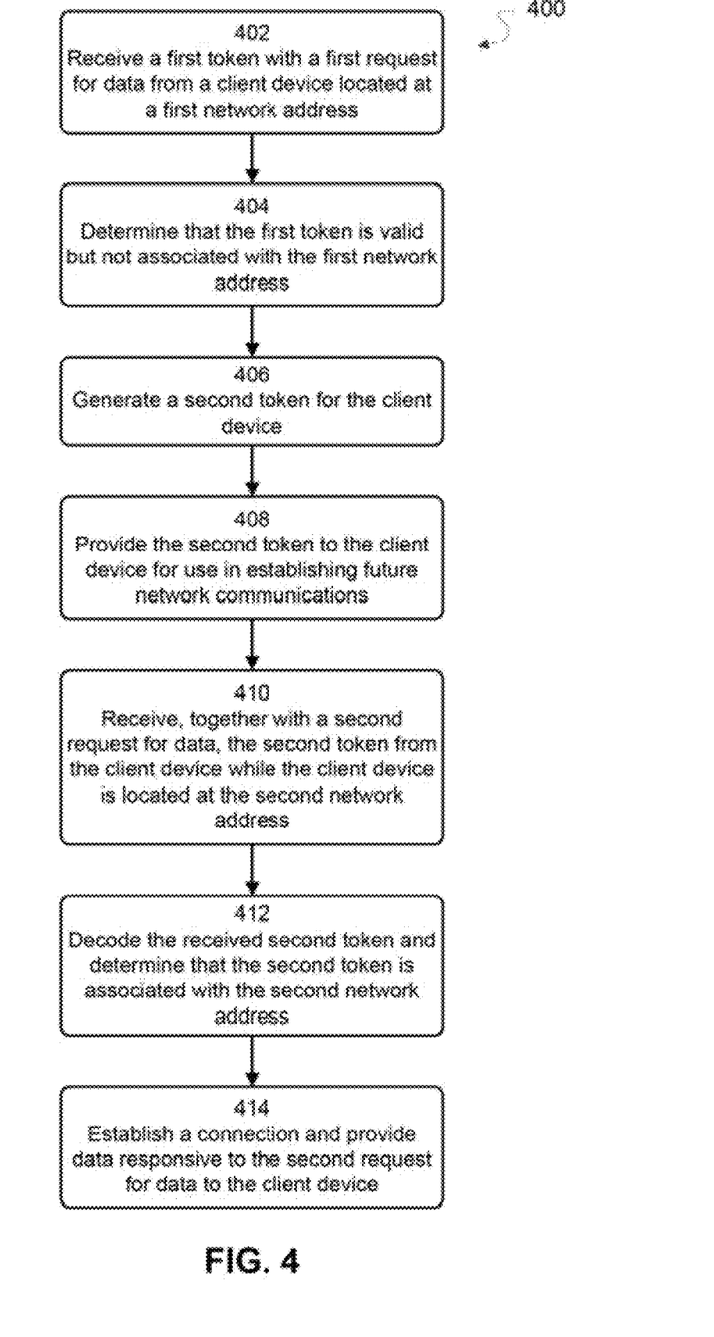
FIG. 4 illustrates a flow diagram of an example process for generating a source address token for use in rapidly establishing connections with a computing device at changing network locations.

FIG. 4 illustrates a flow diagram of an example process 400 for generating a source address token for use in rapidly establishing connections with a computing device at changing network locations, according to various aspects of the subject technology. For explanatory purposes, example process 400 is described herein with reference to the components of FIG. 1; however, example process 400 may also be applicable to portions of FIGS. 2, 3, and 5, or other component data flows and process described herein. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

In the depicted example process 400, a first token is received by a server device 102 with a first request for data from a client device 104 located at a first network address (402). The first token being associated with a second network address previously associated with the computing device during one or more previous network communications with the server device 102. According to one or more implementations, the first request for data is received without establishing a network connection with the computing device through one or more round-trip network communications, for example, through handshaking (e.g., TCP). In this regard the first packet received may have a data request in addition to the first token. The data request may include any request for data including, for example, a request for a webpage or other data stored by a web server (e.g., HTTP request).

The server device 102 determines that the first token is valid but not associated with the first network address (404). The server device 102 may determine that a first token is valid by being able to decode the token. For example, the first token may be in a format not readable by the client device 104. The token or parts of the token may be hashed and/or otherwise encrypted to prevent the contents of token from being read or modified by any device other than the server device 102. The server device 102 may decode the token using a hash value (or secret cryptographic key) known only to the server device 102. Additionally or in the alternative, the server device 102 may determine that the first token is valid by verifying its authenticity using the hash value and corresponding hash function.

According to various implementations, the first token may be associated with one or more network addresses by way of having respective network address representations of the one or more network addresses embedded within the first token. As described previously, a network address representation may be an electronic copy of the corresponding network address or a portion of the network address used for authenticating those network addresses that match the portion. Additionally or in the alternative, a network address and/or its representation may include a network address (or partial network address) together with an associated port number for the client device 104.

In one or more implementations, determining that the first token is not associated with the first network address may include the server device 102 decoding at least a portion of the first token to reveal the respective network address representations, and then determining that the first network address is not associated with any of the respective network address representations. The determination may be made by the server device 102 iterating through the network address representations embedded within the first token to determine if the current address of the client device 104 is represented within the token.

A second token for the client device 104 is generated by the server device 102 (406). The second token is configured to, according to various aspects described herein, facilitate the rapid establishment of a connection from one or more network addresses previously used by the client device 104 to communicate with the server device 102. In the example, of FIG. 4, the server device 102 may not generate the second token until the first token has been successfully decrypted and/or authenticated. However, the server device may issue a new token for the current network address of the client device 104, thereby ignoring any network address previously used by the client device 104 that may be associated with a token that the server device 102 cannot (or did not) decrypt and/or authenticate.

According to various aspects, the second token generated by server device 102 is associated with the first network address and the second network address previously associated with the client device 104. The server device 102 may associate new network addresses with the client device 104 as the server interacts with the client device 104 at each new network address. In this regard, a plurality of network address representations may be embedded within the first token when it is received and decoded by the device 102.

According to one of more implementations, the server device 102 may monitor the state of the network address representations embedded within each token to expire (e.g., delete, remove, or replace) network addresses as appropriate. For example, one or more implementations, each network address representation embedded in the first token may be associated with a respective point in time corresponding to a last communication in which the network address representation embedded within the first token was used in a network communication with the server device 102. The server device 102 may compare the respective points in times associated with the network address representations associated with the first token with a current time, and embed network addresses representations having respective points in times before the current time in the generated second token, while not embedding network address representations having other respective points in times.

In one or more implementations, the server device 102 may determine that the plurality of network address representations embedded in or otherwise associated with the first token is at a threshold limit. The server device 102, may then update the plurality of address representations to remove at least one address representation from the plurality of address representations, and then embed the updated plurality of network address representations and a representation of the second network address in the second token before providing the second token to the client device 104. The threshold limit may include a predetermined number or network address representations (e.g., 10), or a predetermined data size such that a data size associated with the plurality of network address representations is not larger than the predetermined data size.

In one or more implementations, each network address representations may be ordered among the plurality of network address representations according to previous use of the network address representation to one or more network communications. The server device 102 may then remove at least one address representation according to its order within the plurality of network address representations. For example, the server device 102 may remove the network address representation at the end of a sequence, with the end of the sequence including those network address representations least used by the client device 104 to connect to the server device 102.

Once the second token is constructed by the server device 102, the second token provided by the server device 102 to the client device 104 for use in establishing future network communications with the server device 102 (408). The second token may be provided together with data responsive to the request for data received from the client device 104.

Optionally at a later time, the server device 102 receives, together with a second request for data, the second token from the client device 104 while the client device is located at the second network address (410). Accordingly, where the first network address may be a home address, the second network address may be a work address. As described above, the second (work) address was embedded in the token when the token was used while the client device 104 was at the first (home) address. The server device 102 did not delete or replace the second (work) address, but instead generated the second token with the first and second addresses. Now, the client device is back at the second (work) address.

The server device 102 decodes the received second token and determines that the second token is associated with the second (work) network address (412). In response to determining that the received second token is associated with the second network address, the server device 102 establishes a connection with the client device 104 (e.g., based on pre-existing parameters associated with the second (current) network address (work address)) and provides data responsive to the second request for data to the client device 104 (414). Thus, the client device 104 is able to connect to the server device 102 from multiple network locations without multiple round trips to set up new connections. Each connection (including, e.g., a preexisting encryption scheme) is quickly set up and data transmitted and received with minimal latency. Accordingly, a public key or other cryptography configuration (e.g., common to all connections made by the server 102) may be used in a new connection.

The above-described example processes 300 and 400, and related features and applications, may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
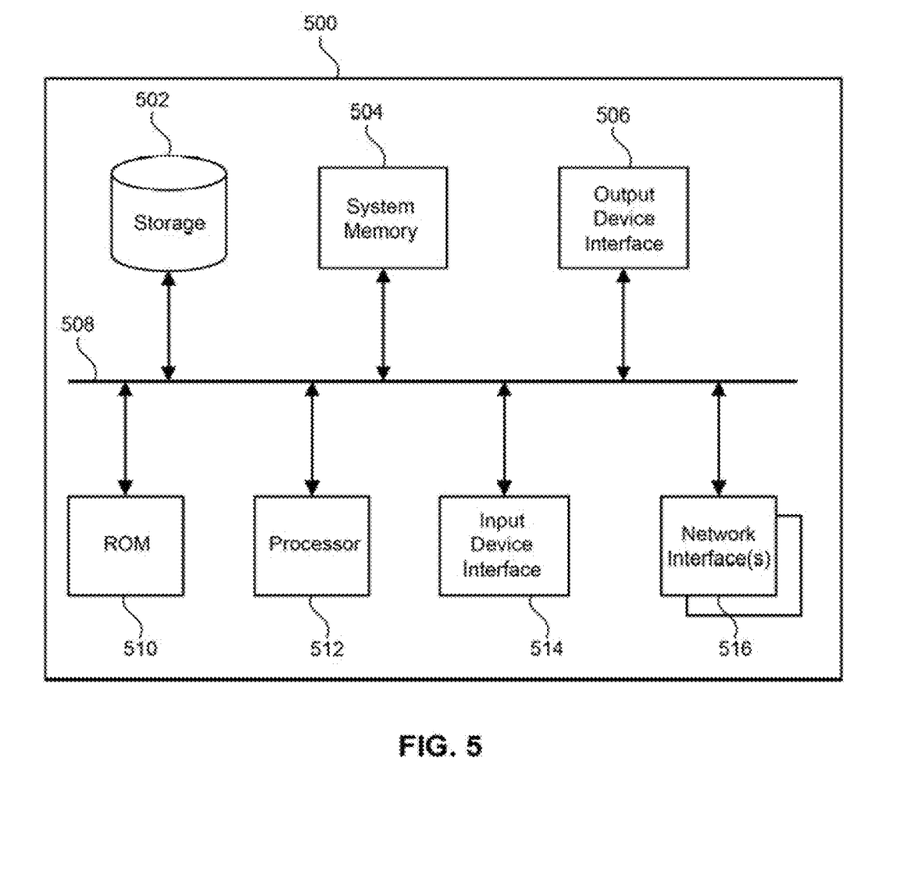
FIG. 5 is a diagram illustrating an example electronic system for use in rapidly establishing connections with a computing device at changing network locations.

FIG. 5 is diagram illustrating an example electronic system 500 for use in rapidly establishing connections with a computing device at changing network locations, according to one or more aspects of the subject technology. Electronic system 500 may be a computing device for execution of software associated with the operation of the computing devices and data flows described with regard to FIGS. 1 and 2, or one or more portions or steps of process 300 and 400 of FIGS. 3 and 4, respectively. In various implementations, electronic system 500 may be representative of server device 102 or client device 104, or a different computer, server, phone, PDA, laptop, tablet computer, touch screen or television with one or more processors embedded therein or coupled thereto, or any other sort of electronic device.

Electronic system 500 may include various types of computer readable media and interfaces for various other types of computer readable media. In the depicted example, electronic system 500 includes a bus 508, processing unit(s) 512, a system memory 504, a read-only memory (ROM) 510, a permanent storage device 502, an input device interface 514, an output device interface 506, and one or more network interfaces 516. In some implementations, electronic system 500 may include or be integrated with other computing devices or circuitry for operation of the various components and processes previously described.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic systems. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touch-screen that functions as both input and output devices.

Finally, as shown in FIG. 5, bus 508 also couples electronic system 500 to a network (not shown) through network interfaces 516. Network interfaces 516 may include, for example, a wireless access point (e.g., Bluetooth or Wifi). Network interfaces 516 may also include hardware (e.g., Ethernet hardware) for connecting the computer to a part of a network of computers such as a local area network ("LAN"), a wide area network ("WAN"), or an Intranet, or a network of networks, such as the Internet. Any or all components of electronic system 500 can be used in conjunction with the subject disclosure.

The functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor of multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information the user and a keyboard and pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Heading and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiments may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantages over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
    receiving a first token with a first request for data from a computing device located at a first network address, the first token being embedded with a representation of a second network address previously associated with the computing device, the embedded representation of the second network address not readable by the computing device;
    determining that the first token is not embedded with a representation of the first network address;
    generating, based on the first token being embedded with the representation of the second network address and not being embedded with the representation of the first network address, a second token for the computing device, the second token including respective embedded representations of the first network address and the second network address; and
    providing the second token to the computing device for use in establishing future network communications from the first network address and from the second network address.

2. The computer-implemented method of claim 1, wherein the first request for data is received without establishing a network connection with the computing device through one or more round-trip network communications.

3. The computer-implemented method of claim 1, further comprising:
    determining that the first token is a valid token before generating the second token.

4. The computer-implemented method of claim 1, further comprising:

receiving, together with a second request for data, the second token from the computing device while the computing device is located at the second network address;

determining that the received second token is associated with the second network address; and in response to determining that the received second token is associated with the second network address, reestablishing a connection based on preexisting parameters associated with the second network address and providing data responsive to the second request for data to the computing device.

5. The computer-implemented method of claim 1, wherein determining that the first token is not embedded with a representation of the first network address comprises:

decoding at least a portion of the first token to reveal respective network address representations embedded in the first token; and determining that none of the revealed respective network address representations represent the first network address.

6. The computer-implemented method of claim 5, wherein at least a portion of the first token is encrypted, the at least a portion of the first token being decrypted to validate the first token before generating the second token.

7. The computer-implemented method of claim 5, wherein a plurality of network address representations are embedded within the first token, each network address representation being associated with a respective point in time corresponding to a last communication in which the network address representation embedded within the first token was used in a network communication.

8. The computer-implemented method of claim 7, further comprising:

comparing the respective points in times associated with the network address representations associated with the first token with a current time; and embedding network addresses representations having respective points in times before the current time in the generated second token, while not embedding network address representations having other respective points in times.

9. The computer-implemented method of claim 5, wherein a plurality of network address representations are embedded within the first token, the method further comprising:

determining the plurality of network address representations is at a threshold limit;

updating the plurality of address representations to remove at least one address representation from the plurality of address representations; and embedding the updated plurality of network address representations and a representation of the second network address in the second token before providing the second token to the computing device.

10. The computer-implemented method of claim 9, wherein the threshold limit comprises a predetermined number of network address representations.

11. The computer-implemented method of claim 9, wherein the threshold limit comprises a predetermined data size such that a data size associated with the plurality of network address representations is not larger than the predetermined data size.

12. The computer-implemented method of claim 9, wherein each network address representation is ordered among the plurality of network address representations according to previous use of the network address representation in one or more network communications, the at least one address representation being removed according to its order within the plurality of network address representations.

13. The computer-implemented method of claim 5, wherein each network address representation comprises a partial network address.

14. The computer-implemented method of claim 5, wherein each network address representation comprises a network address together with an associated port number.

15. A system, comprising one or more processors; and a memory including instructions that, when executed by the one or more processors, cause the one or more processors to facilitate the steps of:

receiving a first token with a first request for data from a computing device located at a first network address, the first token being embedded with a representation of a second network address previously associated with the computing device, wherein the embedded representation of the second network address is not readable by the computing device, and the first token and the first request for data is received without establishing a network connection with the computing device through one or more round-trip network communications based on the first token being embedded with the representation of the second network address;

determining that the first token is a valid token;

determining that the first token is not embedded with a representation of the first network address;

generating, based on the first token being embedded with the representation of the second network address and not being embedded with the representation of the first network address, a second token for the computing device, the second token including respective embedded representations of the first network address and the second network address; and providing the second token to the computing device for use in establishing future network communications from the first network address and from the second network address.

16. The system of claim 15, wherein the instructions, when executed, further cause the one or more processors to facilitate the steps of:

receiving the second token with a second request for data from the computing device while the computing device is located at the second network address;

determining that the received second token is associated with the second network address; and in response to determining that the received second token is associated with the second network address, providing data responsive to the second request for data to the computing device.

17. The system of claim 15, wherein determining that the first token is not embedded with a representation of the first network address comprises:

decoding at least a portion of the first token to reveal respective network address representations; and determining that none of the revealed respective network address representations represent the first network address.

18. The system of claim 15, wherein the at least a portion of the first token is decoded using a decryption scheme not known to the computing device before the second token is generated.

19. A computer program product tangibly embodied in a computer-readable storage device and comprising instructions that, when executed by a first computing device, configures the first computing device to:

facilitate receiving a first token with a first request for data from a second computing device located at a current network address, the first token being embedded with respective network address representations of one or more network addresses previously associated with the second computing device during one or more network communications with a first computing device, the respective network address representations being in a format not readable by the second computing device;

decoding at least a portion of the first token using an algorithm stored at the first computing device to reveal the respective network address representations and to determine that the first token is a valid token;

determine that the current network address of the second computing device is not represented by any of the revealed respective network address representations;

generate a second token for the second computing device, the second token being embedded with the current network address and the one or more network addresses previously associated with the second computing device; and provide the second token to the second computing device for use in establishing future network communications with the first computing device.

20. The computer program product of claim 19, wherein the instructions, when executed, further causing the first computing device to:

provide data responsive to a second request for data to the second computing device in connection with providing the second token to the second computing device.

* * * * *